Dec. 30, 1958           E. E. FRENCH           2,866,228
MEANS FOR SUPPORTING A TIRE IN A RETREADING MOLD
Filed Nov. 30, 1956           3 Sheets-Sheet 1
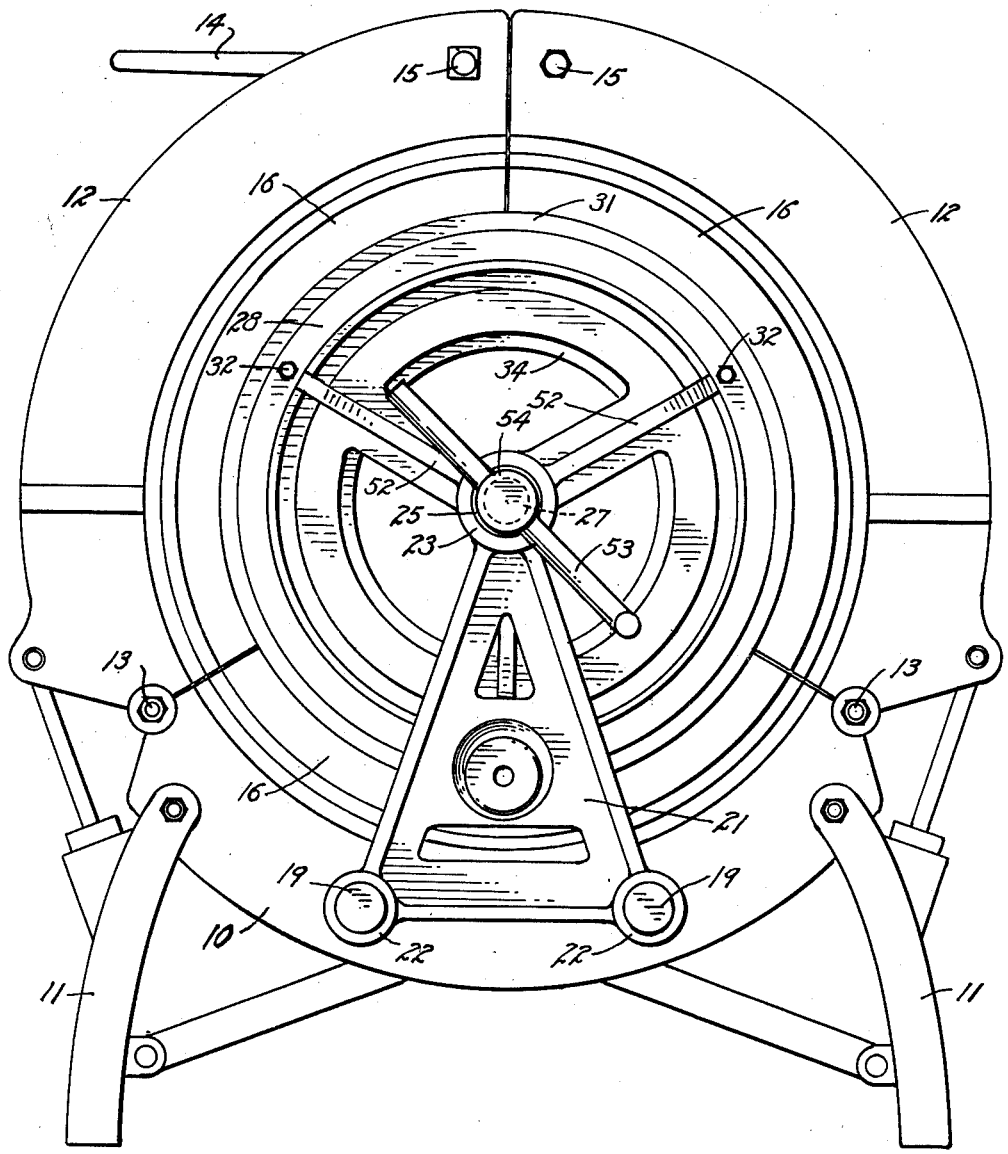
INVENTOR.
ELBY EDWARD FRENCH
BY
ATTORNEY

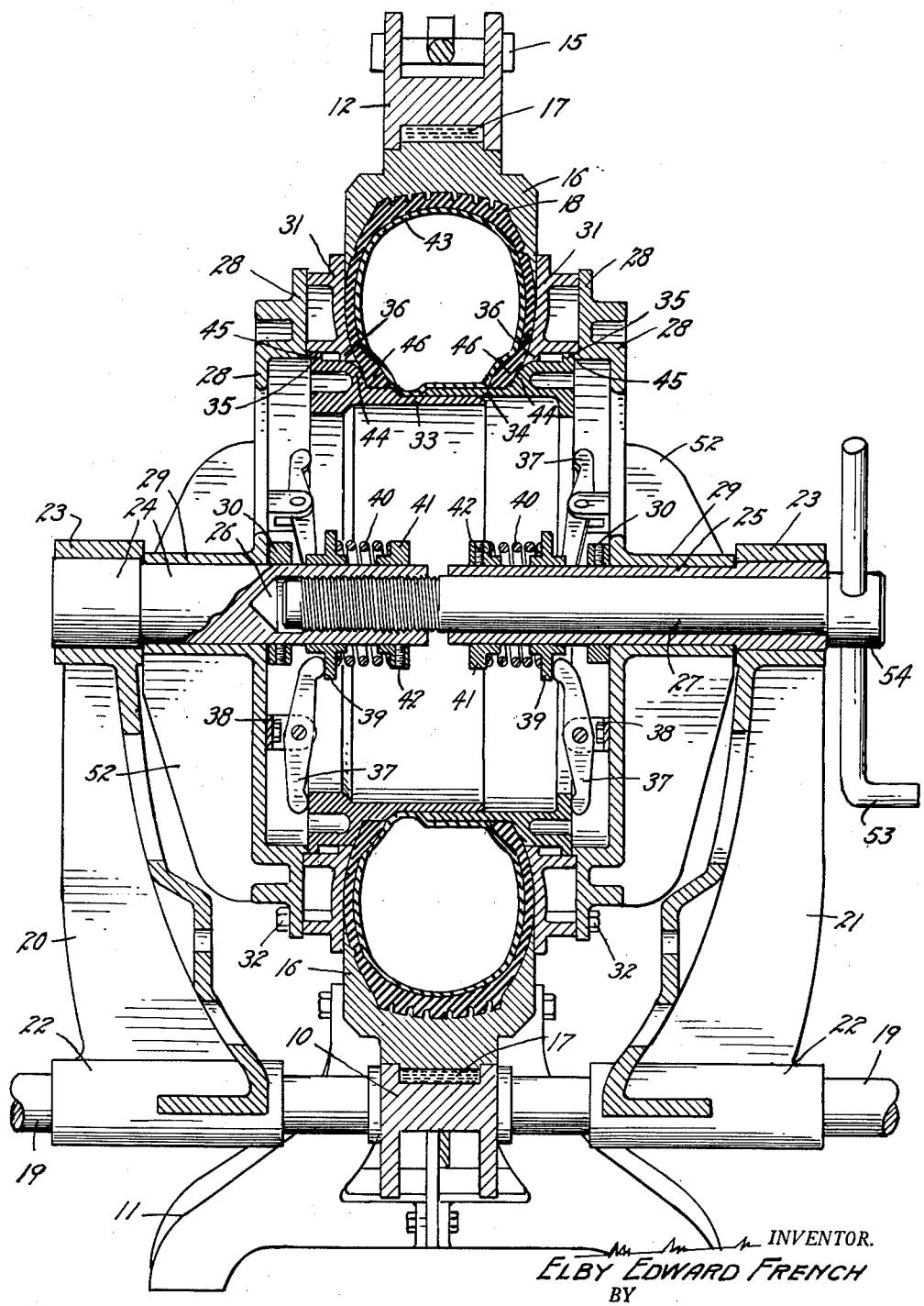

Dec. 30, 1958      E. E. FRENCH      2,866,228
MEANS FOR SUPPORTING A TIRE IN A RETREADING MOLD
Filed Nov. 30, 1956      3 Sheets-Sheet 3
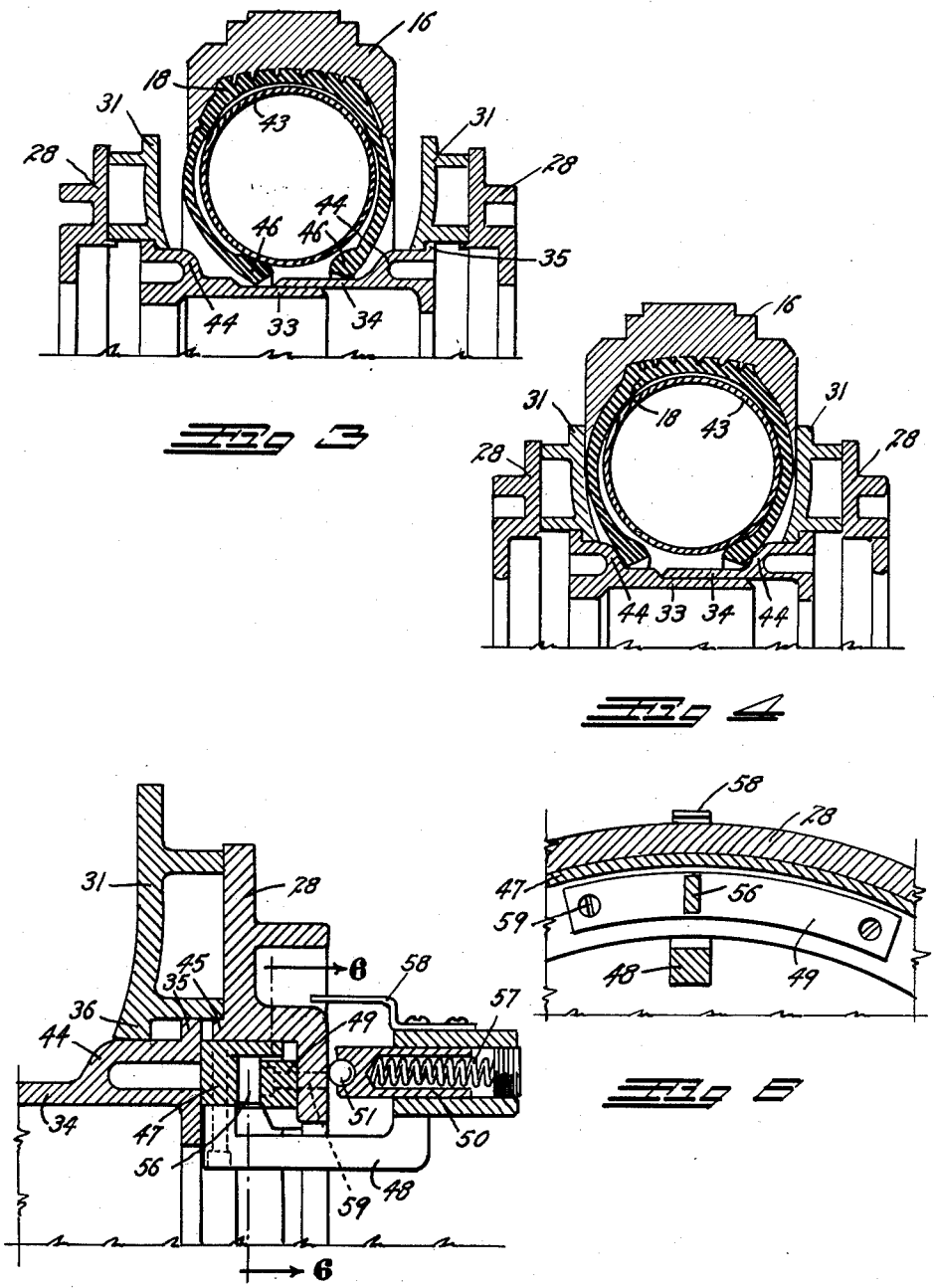
INVENTOR.
ELBY EDWARD FRENCH
BY
ATTORNEY

2,866,228
MEANS FOR SUPPORTING A TIRE IN A RETREADING MOLD

Elby Edward French, Littleton, Colo., assignor to O. K. Ko-Op Rubber Welding System, Littleton, Colo., a corporation of Colorado Application November 30, 1956, Serial No. 625,320

6 Claims. (Cl. 18—18)

This invention relates to a tire retreading mold, more particularly of the type illustrated and described in prior Patent No. 2,730,764, and has for its principal object the provision of an accurate tire-bead-supporting-structure for use with a conventional tire retreading mold which will accurately support the two beads of the tire concentrically of the tread and in parallel centered relation to the medial plane of the tread of the tire so that when the retreading operation has been completed, the tire will be in perfectly aligned and balanced condition.

Another object of the invention is to provide a rigid, circular, rim member for insertion in the wheel opening of a tire during retreading operation which will support the tire in its natural, in-use position and to so construct the rim member that it may be quickly, easily and accurately inserted in a tire after the latter is in position in a tire curing mold to provide accurate centering and accurate alignment of the retread being placed upon the tire.

A further object is to eliminate the usual inaccurate, expansible central core structure usually employed in tire retreading molds.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of a conventional tire retreading mold with the invention in place therein;

Fig. 2 is a slightly enlarged vertical medial cross-section through the mold of Fig. 1;

Figs. 3 and 4 are detail sectional views illustrating steps in the use of the invention;

Fig. 5 is an enlarged detail section illustrating an alternate form of the invention; and Fig. 6 is a detail, fragmentary section, taken on the line 6—6, Fig. 5.

The invention has been illustrated in position in a tire retreading mold of the type illustrated and described in prior Patent No. 2,730,764. Such a mold employs an arcuate, fixed, bottom frame member 10 supported upon a suitable base frame 11. Two similar arcuate, side frame members 12 are pivotally mounted at the extremities of the bottom frame member 10 upon suitable pivot members 13 so that they may be swung into contact at their upper extremities to form a complete closed circle. The frame members 12 are locked in the closed circle by means of a suitable latch lever 14 and latch bolts 15. An arcuate tire retread matrix section 16 is mounted in each of the frame members 10 and 12, the three matrix sections being curvated to form a complete circle when the frame members are closed. A suitable heating element 17 is mounted in each frame member.

The above described mold is well-known in the art and has only been described and illustrated here to show the application of the present invention thereto. Such devices are usually provided with an expansible central core structure for expanding and supporting the casing beads 46 in the mold. Such structures urge the bead portions of the casing outwardly often causing distortions which when the retreaded casing is placed on the wheel result in eccentricity and unbalance of the wheel.

This invention is designed more particularly for concentrically and accurately supporting the beads 46 of a tire casing, such as indicated at 18, within the circular matrix so that the retread will be in accurate, aligned, concentric and balanced relation with the beads. In accomplishing the objects of the invention, two horizontal slide bars 19 are mounted on or extended through the bottom frame member 10 so as to extend oppositely outward from the latter in parallel relation. Supporting brackets 20 and 21 are slidably mounted on the projection slide bars 19 at each side of the tire mold. The brackets are provided with slide tubes 22 which may slide upon the bars and support cylindrical guide sleeves 23, respectively, concentrically with and upon opposite sides of the mold and in axial alignment with each other.

An axle stud 24 is rigidly mounted in the sleeve 23 and extends concentrically within the tire mold to approximately the vertical center plane thereof. An axle tube 25 is rigidly mounted in the other sleeve 23 and similarly extends within the tire mold in axial alignment with the axle stud 24. A threaded socket 26 is concentrically formed in the inner extremity of the axle stud 24 and a threaded jackscrew 27 is rotatably mounted in the axle tube 25 and is adapted to be threaded, at its inner extremity, into the threaded socket 26 of the axle stud 24. A head 54 is formed on the outer extremity of the jackscrew through which a hand lever 53 extends.

An annular pressure plate 28 is rotatably mounted on the axle stud 24 and a similar annular pressure plate 28 is rotatably mounted on the axle tube 25. Each of the pressure plates 28 is supported on spokes, preferably three, reinforced by brace webs 52 and extending radially from a tubular hub 29, one being mounted on the axle stud 24 and one on the axle tube 25. Each hub 29 is positioned between the adjacent guide sleeve 23 and a set collar 30. The set collars 30 are secured on the respective members 24 and 25 by means of suitable set screws 55 so as to prevent longitudinal movement of the hubs 29 and yet allow free rotative movement thereof.

A side wall ring 31 is concentrically and accurately mounted on the inner face of each of the pressure plates 28 upon an annular aligning flange 45, such as by means of suitable cap screws 32. The inner faces of the side wall rings 31 are contoured to conform to the curvature of the sides of the tire casing 18 and are adapted to bear against the opposite sides of the closed circular matrix sections 16. A first telescoping rim section 33 is concentrically maintained in place within one of the side wall rings 31 and between the latter and the adjacent pressure plate 28. A second cylindrical, telescoping rim section 34 is similarly maintained in place within the other side wall ring 31 and between the latter and the other adjacent pressure plate 28.

The rim sections 33 and 34 are cylindrical and project inwardly toward each other, the second rim section 34 slidably and telescopically overlapping the cylindrical first rim section 33. The rim sections are provided with peripheral, radially projecting edge flanges 35 which ride in the side wall rings 31 to maintain the rim sections concentric with the former and yet allow relative axial movement between the rim sections and the side wall rings.

Each of the telescoping rim sections is constantly and resiliently urged inwardly from its side wall ring 31 by means of a plurality of rocker arms 37, there being one rocker arm mounted in a bearing clip 38 on the inner face of each of the spokes of each of the pressure plates 28. The inward projection of each rim section is limited by means of a retaining flange 36 formed in the adjacent side wall ring to be contacted by the edge flange 35. When the rim sections are fully compressed into the side wall rings, the flanges 35 thereon will rest against the aligning flanges 45 on pressure plates and a peripheral side bead protuberance 44 on each rim section will be in substantial alignment with the contoured sides of the side wall rings as shown in Fig. 2.

When the rim sections are not in contact with a tire casing, they will project resiliently inward from the side wall rings under the influence of springs 40 with the flanges 35 in contact with the flanges 36 as shown in Fig. 3. The inner extremities of the rocker arms 37 bear against sliding collars 39, there being one sliding collar mounted on the axle stud 24 and a similar one mounted on the axle tube 25. The outer extremities of the arms 37 bear against the outer faces of the rim sections 33 and 34.

The sliding collars 39 are constantly urged outwardly by means of the compression springs 40 which react against spring set rings 41, there being one of the spring set rings 41 mounted on the axle stud 24 and a similar one mounted on the axle tube 25. The spring set rings are provided with suitable set screws 42 by means of which they may be locked against movement on their respective supporting members.

*Operation*

To receive a rebuilt tire casing, the side frame members 12 are opened and the brackets 20 and 21 are pulled outwardly away from each other on the slide bars 19. The rebuilt tire casing with a deflated annular air bag 43 in place therein is then set in the bottom frame member 10 and the two supporting brackets are forced inwardly toward each other in the slide bars 19 until the jackscrew 27 engages the threaded socket 26. As the rim sections approach each other, the adjacent annular edges of the rim sections will contact the bead portions of the casing and bend them inwardly toward each other, as shown diagrammatically in Fig. 3. Rotation of the jackscrew 27 now forces the rim sections into telescoping relation and the inward movement is continued until the side wall rings clamp against the closed tread matrix. It will be noted that as the rim sections approach each other the casing beads will be resiliently maintained bent inwardly by the annular bead protuberances 44, as shown in Fig. 4.

The air bag 43 is now inflated as is customary in tire curing. The expansion of the air bag forces the casing beads 46 outwardly on the cylindrical surfaces of the rim sections as shown in Fig. 5. As the beads move outwardly, they will wedge against the rim sections so as to exert a radial pressure to firmly force the casing outward into the matrix sections 16. The expansion of the air bag 43 is, of course, uniform in all directions and this expanding action will force the two tire beads uniformly outward against the resistance of the springs 40 until the flanges 35 of the rim sections 33 and 34 contact the aligning flanges 45, at which time, the two beads 46 will be in accurate firm contact with the concentric rim sections and in accurate spaced relation from the center plane of the casing 18 so that the tread cured by the matrix sections 16 will be concentric and in accurate alignment with the medial plane as shown in Fig. 2. When the curing is completed, the jackscrew is unscrewed from the socket 26 and the two supporting brackets 20 and 21 are pulled outwardly from each other on the slide bars 19. The side frame members 12 are then opened on their pivot members 13 and the accurately cured tire is removed.

The invention, as above described, is predesigned to accommodate a given tire size. Various sizes of tires require various matrixes and various spacings between the two beads 46. If it is desired to have the device adaptable to these various sizes, means must be provided to limit the outward movements of the rim sections 33 and 34. One such means is illustrated in Figs. 5 and 6 in which a rotatable stop adjustment ring 47 is positioned within each of the side pressure plates 28 between the latter and the rim sections 33 and 34 as shown in Fig. 6. The stop adjustment ring 47 is provided with arms 48 extending through the spaces between the spokes of the pressure plates 28 by means of which the ring 47 may be rotated. Inclined wedge members 49 are secured at equally spaced points within the pressure plates by means of suitable attachment screws 59 and the adjustment ring is provided with bosses 56 which when the ring 47 is rotated, engage the wedge members 49 so as to urge the adjustment ring 47 axially so that it may be set to stop the outward movement of the rim sections 33 and 34 so as to position the beads 46 at any desired spacing depending upon the size of the particular tire being retreaded. The stop adjustment rings are maintained in resilient relation to the wedge members 49 by means of suitable springs 57 mounted in spring tubes 50 carried by each of the arms 48. The springs 57 urge bearing balls 51 against the outer faces of the side plates to constantly maintain the stop ring against the inclined wedge members.

In the adjustable form of the invention, it is preferred to mount an index pointer 58 on the stop ring to assist in accurately rotating the ring 47 to the desired tire size. The pointer indicates the settings on a suitable tire index scale carried by the pressure plate 28.

While a specific form of the improvement has been described and illustrated herein, it is desired to be understood that the same may be varied within the scope of the appended claims, without departing from the spirit of the invention.

Having thus described the invention, what is claimed and desired secured by Letters Patent is:

1. Means for concentrically supporting the rim portion of a tire within a circular retreading mold comprising: a slide bar projecting laterally outwardly from each of the opposite sides of said mold in axial alignment, a supporting bracket slidably mounted on each of said slide bars, an axle stud rigidly supported by one of said brackets and extending concentrically within said mold, an axle tube rigidly supported by the other bracket and also extending concentrically within said mold in axial alignment with said axle stud, a threaded jackscrew rotatably mounted in said axle tube and adapted to be threaded at its inner end into said axle stud, an annular pressure plate mounted on said axle stud, a similar annular pressure plate mounted on said axle tube, a tire side wall ring concentrically mounted on the inner face of each pressure plate at the periphery thereof, said side wall rings having opposed inwardly concave faces for engaging the opposite side walls of said tire when said jackscrew is threaded into said axle stud, and a cylindrical rim section supported by and within each of said side wall rings.

2. The structure according to claim 1, wherein each of said rim sections is provided with a tire bead engaging protuberance adapted to engage a respective bead portion of the tire, and means resiliently urging said rim sections from said side wall rings.

3. The structure according to claim 2, together with stop means limiting the degree of movement of said rim sections toward said side wall rings.

4. The structure according to claim 1, wherein said rim sections are supported by said side wall rings for axial movement relative thereto, and means for resiliently urging said rim sections from said side wall rings and toward said tire.

5. The structure according to claim 1, wherein said side wall rings are each provided with a radially inwardly projecting flange, said rim sections each having an outwardly directed flange, and yieldable means urging said rim sections into telescoped position with the flanges thereof engaged with the flanges on said side wall rings.

6. The structure according to claim 1, wherein each of said brackets is provided with a tube slidably engaged with a respective slide bar, each of said brackets being further provided with a guide sleeve, and the outer ends of said axle stud and said axle tube being rigidly supported in the respective sleeves, and said pressure plates being rotatably supported on said axle tube and said axle stud.

References Cited in the file of this patent

UNITED STATES PATENTS

| | | |
|---|---|---|
| 2,147,339 | Glynn | Feb. 14, 1939 |
| 2,272,231 | Voth | Feb. 10, 1942 |
| 2,593,137 | Glynn | Apr. 15, 1952 |
| 2,672,651 | Smyser | Mar. 23, 1954 |

FOREIGN PATENTS

| | | |
|---|---|---|
| 457,208 | Great Britain | Nov. 24, 1936 |